Patented Feb. 11, 1941

2,231,344

UNITED STATES PATENT OFFICE 2,231,344

GUM INHIBITOR

Augustine F. S. Musante, Media, and John Harold Perrine, Prospect Park, Pa., assignors to Sun Oil Company, Philadelphia, Pa., a corporation of New Jersey No Drawing. Application August 22, 1939,
Serial No. 291,326

5 Claims. (Cl. 44—9)

The object of the invention is to improve hydrocarbon oil, and particularly gasoline and more especially gasoline produced by cracking a higher boiling petroleum fraction, by preventing the formation of gum during storage for a prolonged period of time. It is well known that in ordinary gasoline, formation of gum proceeds slowly for a time, after which the rate of formation increases suddenly and proceeds rapidly. It is also well known that gum formation may be retarded and even substantially prevented by the addition of various organic compounds. Many of such compounds, however, are objectionable because they are relatively soluble in water, or because they are soluble only with difficulty in gasoline, or because their relative solubility in water and gasoline is not of the character hereinafter explained as necessary. Many others have definite and even substantial gum-inhibiting properties, but are effective only in retarding the rate of gum formation or of prolonging for an insufficient time the limited period during which the rate of gum formation in untreated gasoline may be slow.

In the present highly developed state of the art no gum inhibitor can be deemed satisfactory unless the treated gasoline in storage will remain stable for a long period of time approximating (say) one year, and unless the gum inhibitor possesses the water-oil solubility characteristics hereinafter explained; and the inhibitor must be reasonable in cost and effective when added in very small proportion, and must have no characteristics that for other reasons would make its use objectionable.

Different methods are known for testing the resistance of gasoline to gum formation in storage without actually storing the same. The most nearly reliable of such tests is generally deemed to be the bomb induction test, described by Winning & Thomas, Industrial and Engineering Chemistry, Vol. 25, 1933, page 511. By this test the so-called induction periods of the untreated and treated gasoline are ascertained. The increase in the induction period bears a relation to storage stability. While such relation is not so nearly invariable as to enable storage stability to be accurately calculated therefrom, a great increase in the induction period indicates storage stability for a prolonged period. While some gasolines in which the induction periods have been increased by the use of an inhibitor by 150 minutes have proved stable in storage for as long as a year, and while gasolines in which the original induction periods of treated gasolines have been increased 200 minutes nearly always prove stable in storage for more than a year, the lack of a precise, as distinguished from an approximate, relationship between increase in the induction period and storage stability makes it highly desirable that the increase in the induction period should considerably exceed 200 minutes.

We have found that the addition to gasoline of the reaction product of trichlorpropane + p-phenylenediamine will increase the induction period to approximately from eight to fifteen hours.

When symmetrical trichlorpropane is reacted with p-phenylenediamine the hydrochloride of three different products may be obtained, depending upon the number of moles of each product reacted.

Thus, if one mole of trichlorpropane is reacted with one mole of p-phenylenediamine the reaction is represented by the following equation:

$C_3H_5.Cl_3 + H_2N.C_6H_4.NH_2 \rightarrow$
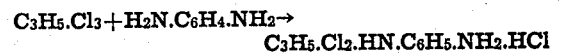
$C_3H_5.Cl_2.HN.C_6H_5.NH_2.HCl$ If one mole of trichlorpropane is reacted with two moles of p-phenylenediamine the reaction is as follows:

$C_3H_5.Cl_3 + 2H_2N.C_6H_4.NH_2 \rightarrow$
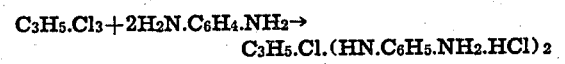
$C_3H_5.Cl.(HN.C_6H_5.NH_2.HCl)_2$ If one mole of trichlorpropane is reacted with three moles of p-phenylenediamine all of the chlorine atoms are removed from the trichlorpropane and a residue of p-phenylenediamine takes their place. Thus:

$C_3H_5.Cl_3 + 3H_2N.C_6H_4.NH_2 \rightarrow$
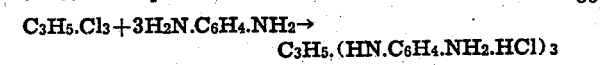
$C_3H_5.(HN.C_6H_4.NH_2.HCl)_3$ Depending on the number of moles of p-phenylenediamine which are reacted with one mole of symmetrical trichlorpropane, we obtain the hydrochlorides of:

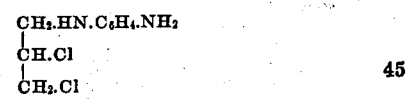

or

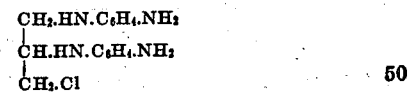

or

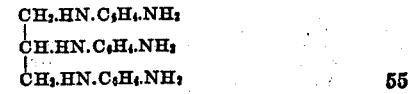

These hydrochlorides are obtained by reacting the two products, symmetrical trichlorpropane and p-phenylenediamine, either under pressure or by long refluxing. The hydrochlorides are broken down to the free base by means of a rather concentrated solution of caustic soda. The solid free base is then thoroughly washed with water, in order to remove the excess caustic soda and the salt. It is then dried.

The unreacted trichlorpropane and the unreacted p-phenylenediamine are removed by treatment with acetone, and the residue, containing the free base or bases, is finally extracted with alcohol. The alcoholic extract contains one or more of the free bases referred to. The alcohol is evaporated and the free base or bases used as such as gum inhibitors.

The light-colored product,

$C_3H_5.Cl_2.HN.C_6H_4.NH_2$, has a melting point of 135° C. It is insoluble in water and in carbon tetrachloride, slightly soluble in benzene, and readily soluble in alcohol. 0.0384 grams is dissolved by 100 cc. of gasoline at 20° C. If previously wet with alcohol, 0.0994 grams is dissolved by 100 cc. of gasoline at 20° C.

In concentrations of 0.03 percent, in gasoline, the following "induction periods" were observed.

| Induction period of raw gasoline | Induction period of gasoline+0.03 percent of above gum inhibitor | Increase in induction period due to inhibitor |
|---|---|---|
| 3¾ hours | 18½ hours | 14¾ hours (885 minutes) |

The product $C_3H_5.Cl(HN.C_6H_4.NH_2)_2$ has a melting point of 80° C. It is insoluble in water, carbon tetrachloride and benzene, readily soluble in alcohol, and slightly soluble in gasoline. Only 0.0225 grams of this product is dissolved by 100 cc. of gasoline. If the sample is previously wet with alcohol 0.1016 grams is dissolved by 100 cc. of gasoline.

In concentrations of 0.03 percent, in gasoline, the following "induction periods" were observed:

| Induction period of raw gasoline | Induction period of gasoline+0.03 percent of above gum inhibitor | Increase in induction period due to inhibitor |
|---|---|---|
| 3¾ hours | 16¼ hours | 12½ hours (750 minutes) |

The product $C_3H_5.(HN.C_6H_4.NH_2)_3$ has a melting point of 95° C. It is insoluble in water, carbon tetrachloride, and benzene. It is readily soluble in alcohol, and slightly soluble in gasoline. If previously wet with alcohol it is much more soluble in gasoline. After wetting with alcohol 0.1097 grams dissolved in 100 cc. of gasoline. Before wetting with alcohol only 0.037 grams dissolved in 100 cc. of gasoline.

In concentrations of 0.03 percent, in gasoline, the following "induction periods" were observed:

| Induction period of raw gasoline | Induction period of gasoline+0.03 percent of above gum inhibitor | Increase in induction period due to inhibitor |
|---|---|---|
| 3¾ hours | 12 hours | 8¼ hours (495 minutes) |

It is to be observed that each of the above-mentioned reaction products of trichlorpropane and p-phenylenediamine is a valuable gum inhibitor, although each one differs from the others in the degree of potency.

The induction period was measured in two 50 cc. bombs of the character of that disclosed in the Winning and Thomas publication above referred to. The bombs were heated in a steam bath, the steam being generated in the bath by an electric heater. The baths were provided with a constant level water feed. The end of the induction period was taken at the point where the pressure curve dropped sharply. The pressures were recorded on charts. The concentration of the added inhibitor to the gasoline was 0.03 per cent. by weight. The induction period of the raw gasoline (which was that produced by a known thermal cracking process) was found to be about three and three quarters hours, while the induction periods of the same gasoline with the inhibitors added varied from twelve hours to eighteen hours and thirty minutes, giving increased induction periods varying from eight hours and fifteen minutes to fourteen hours and forty-five minutes.

The concentration above specified was chosen in the experimental tests as a matter of convenience; that is, the time for each test was reasonable in length, the magnitude of the effect was easily detected, and all of the observations could be readily compared. There is no objection to any higher concentration except that of cost, and a very much lower concentration is believed to be effective in the case of all gasolines. With some gasolines, a much reduced concentration down to as low as .001 per cent. gives an increase in the induction period sufficient to insure stability on storage for the maximum length of time during which finished gasoline is usually stored. Further, the preferred concentration will vary with the induction period of the untreated gasoline, which may vary from 1½ to 4 hours or within even wider limits. In the case of untreated gasoline having a low induction period a higher concentration of the inhibitor is required, in order to insure the desired storage stability, than with untreated gasoline having a higher induction period.

An advantageous, and indeed practically necessary, characteristic of an inhibitor is that it shall be relatively soluble in gasoline and relatively insoluble in water; that is, when an inhibitor is soluble in both water and gasoline it is essential that the partition ratio with water be low.

It is convenient to dissolve the inhibitor in a relatively small amount of a mutual solvent, such as alcohol, in a concentration much in excess of that desired and then add the solution to such large amount of gasoline as will give the desired concentration.

The raw gasoline to which the inhibitor was added in the above example is typical in that it contains oxidation inhibitors (usually of a phenolic nature), as evidenced by the substantial induction period shown by the tests. Such gasoline has the characteristic hereinbefore mentioned of preventing oxidation until the natural inhibitors become oxidized, after which the gasoline starts to oxidize rapidly. It is desirable, therefore, that the raw gasoline should be subjected to no pre-treatment, such as any treatment that would involve the addition of peroxides, that would destroy the natural inhibitors. However, the inhibitor is operative without, as well as with, the natural inhibitors in gasoline.

The standard boiling range and other characteristics of the fraction of petroleum known as gasoline is not constant but varies from time to time with improved methods of refining and with improvements in internal combustion engines; but the inhibitor is equally efficient when added to any petroleum fraction whose boiling range and other characteristics so nearly approximate contemporary standards that it may be substituted therefor in internal combustion engines and for other known uses. The inhibitor is efficient also as applied to other motor fuels and to other petroleum distillates and liquid hydrocarbons.

What we claim and desire to protect by Letters Patent is:

1. A petroleum hydrocarbon composition resistant to gum formation comprising a petroleum hydrocarbon that on storage will form gum, to which has been added a small percentage of the reaction product of trichlorpropane + p-phenylenediamine.

2. A gasoline composition resistant gum formation comprising gasoline that on storage will form gum, to which has been added a small percentage of the reaction product of trichlorpropane+p-phenylenediamine.

3. A motor fuel resistant to gum formation comprising a hydrocarbon motor fuel that on storage will form gum, to which has been added a small percentage of the reaction product of trichlorpropane+p-phenylenediamine.

4. The process of inhibiting gum formation in gasoline, petroleum distillates and other liquid hydrocarbons that on storage will form gum, which comprises added thereto a small percentage of the reaction product of trichlorpropane+p-phenylenediamine.

5. The process of inhibiting gum formation in gasoline and other hydrocarbon motor fuels that on storage will form gum, which comprises reacting trichlorpropane and p-phenylenediamine, breaking down the hydrochlorides and removing unreacted trichlorpropane and p-phenylenediamine, leaving a residue containing the free base or bases, extracting the same with alcohol and adding the free base or bases to the said hydrocarbon.

AUGUSTINE F. S. MUSANTE.
JOHN HAROLD PERRINE.